US009889755B2

(12) United States Patent
Frament et al.

(10) Patent No.: US 9,889,755 B2
(45) Date of Patent: Feb. 13, 2018

(54) MOBILE INDUCTIVE CHARGING STATION FOR VEHICLES

(71) Applicant: CONTINENTAL AUTOMOTIVE GMBH, Hannover (DE)

(72) Inventors: Olivier Frament, Zeitlarn (DE); Florian Lotz, Brevoerde (DE); Thomas Roehrl, Barbing (DE); Florian Wiegmann, Hannover (DE)

(73) Assignee: Continental Automotive GmbH, Hannover (DE)

(*) Notice: Subject to any disclaimer, the term of this patent is extended or adjusted under 35 U.S.C. 154(b) by 101 days.

(21) Appl. No.: 15/040,167

(22) Filed: Feb. 10, 2016

(65) Prior Publication Data

US 2016/0229301 A1 Aug. 11, 2016

(30) Foreign Application Priority Data

Feb. 20, 2015 (DE) .............................. 10 2015 202 295

(51) Int. Cl.
*H02J 7/00* (2006.01)
*B60L 11/18* (2006.01)

(52) U.S. Cl.
CPC .......... *B60L 11/182* (2013.01); *Y02T 10/7005* (2013.01)

(58) Field of Classification Search
CPC ........ H02J 7/025; H01F 38/14; Y02T 90/122; B60L 11/182; Y02E 60/12
USPC ....................................................... 320/108
See application file for complete search history.

(56) References Cited

U.S. PATENT DOCUMENTS

| 5,821,731 | A | * | 10/1998 | Kuki .................... B60L 11/1805 |
| | | | | 320/108 |
| 5,850,135 | A | | 12/1998 | Kuki et al. |
| 6,525,510 | B1 | * | 2/2003 | Ayano ....................... B60L 3/00 |
| | | | | 320/108 |
| 2011/0181240 | A1 | | 7/2011 | Baarman et al. |
| 2011/0187317 | A1 | * | 8/2011 | Mitake .................... B60L 5/005 |
| | | | | 320/108 |
| 2012/0200151 | A1 | * | 8/2012 | Obayashi .............. B60L 11/123 |
| | | | | 307/9.1 |
| 2012/0280649 | A1 | * | 11/2012 | Jung ....................... H02J 5/005 |
| | | | | 320/108 |
| 2013/0015699 | A1 | * | 1/2013 | Mita ........................ H02J 5/005 |
| | | | | 307/9.1 |
| 2014/0097671 | A1 | | 4/2014 | Nakamura et al. |
| 2014/0239735 | A1 | * | 8/2014 | Abe ........................ H02J 17/00 |
| | | | | 307/104 |
| 2014/0292277 | A1 | | 10/2014 | Chae |
| 2014/0354068 | A1 | | 12/2014 | Horiuchi |

(Continued)

FOREIGN PATENT DOCUMENTS

DE 69711963 T2 11/2002
DE 102011076186 A1 11/2012

(Continued)

*Primary Examiner* — Arun Williams
(74) *Attorney, Agent, or Firm* — Laurence A. Greenberg; Werner H. Stemer; Ralph E. Locher (57) ABSTRACT

A mobile inductive charging station for vehicles has an overlay, a primary coil connected to the overlay, and at least one recess on an upper side of the overlay. The recess is equipped with inner side faces and is adapted to receive at least one tire contact area of a vehicle tire. The overlay has a flat underside opposed to the upper side.

16 Claims, 7 Drawing Sheets

(56) References Cited

U.S. PATENT DOCUMENTS

| | | | |
|---|---|---|---|
| 2015/0028849 A1* | 1/2015 | Covic | H02J 17/00 324/76.11 |
| 2015/0195012 A1* | 7/2015 | Takatsu | B60L 11/182 307/104 |
| 2016/0023565 A1* | 1/2016 | Bell | B60L 11/1833 320/109 |

FOREIGN PATENT DOCUMENTS

| | | |
|---|---|---|
| DE | 102011089339 A1 | 6/2013 |
| JP | H0617408 A | 1/1994 |
| JP | H1028332 A | 1/1998 |
| JP | H11355907 A | 12/1999 |
| JP | 2003061266 A | 2/2003 |
| JP | 2003079006 A | 3/2003 |
| JP | 2012046946 A | 3/2012 |
| JP | 2013021886 A | 1/2013 |
| JP | 2013059239 A | 3/2013 |
| JP | 2013156854 A | 8/2013 |
| JP | 2014155278 A | 8/2014 |
| JP | 2015502725 A | 1/2015 |
| KR | 1020130075580 A | 7/2013 |
| WO | 2013088238 A2 | 6/2013 |
| WO | 2014051044 A1 | 4/2014 |

\* cited by examiner

MOBILE INDUCTIVE CHARGING STATION FOR VEHICLES

CROSS-REFERENCE TO RELATED APPLICATION

This application claims the priority, under 35 U.S.C. §119, of German patent application DE 10 2015 202 295.1, filed Feb. 10, 2015; the prior application is herewith incorporated by reference in its entirety.

BACKGROUND OF THE INVENTION

Field of the Invention:
Equipping vehicles with an electrical drive, which is fed from an internal vehicle battery, is known. In so-called plug-in hybrid vehicles, say, (which have an internal combustion engine in addition to the electrical drive) or in electric vehicles a plug-in electrical contact on the vehicle is used to charge the internal vehicle battery from an external source.

German published patent application DE 10 2011 089 339 A1, for example, discloses a device for the inductive transfer of energy to a vehicle, in which a primary coil let into the floor transfers electrical power to a secondary coil on the vehicle by means of an alternating magnetic field. This affords greater operating convenience than a cable-based charging process, but for the efficient transfer of energy the secondary coil must be situated as precisely as possible above the primary coil.

BRIEF SUMMARY OF THE INVENTION

It is accordingly an object of the invention to provide a mobile inductive charging station for motor vehicles which overcomes the above-mentioned and other disadvantages of the heretofore-known devices and methods of this general type and which allows a vehicle to be easily positioned above a primary coil for the inductive transfer of energy by the simplest means possible.

With the foregoing and other objects in view there is provided, in accordance with the invention, a mobile inductive charging station for a vehicle, the inductive charging station comprising:

an overlay having an upper side and a flat underside opposite the upper side;

a primary coil connected to the overlay; and the overlay having at least one recess formed on the upper side of the overlay, the at least one recess having an inner side face and being configured to receive at least one tire contact area of a vehicle tire.

The mobile inductive charging station for vehicles, as described here, comprises an overlay, so that the overlay can simply be laid on a floor. The overlay is preferably flexible. The inductive charging station comprises at least one recess, which serves for guiding and positioning the vehicle. The recess may also be referred to as a depression or trough. The term recess is to be interpreted generally and is not restricted to producing the relevant physical feature by means of separation.

In particular, no structural measures or other modification of the floor covering are necessary. The inductive charging station can simply be laid on the underlying surface or floor covering. The recess serves for guiding a wheel of the vehicle, especially since the recess is equipped with at least one inner side face. The recess provides a guide for the wheel or the (front) wheels of the vehicle, which guides the vehicle itself to the correct position. The inductive charging station further comprises a primary coil, which is connected to the overlay. The primary coil may be arranged on the overlay, partially or completely sunk in the overlay, or integrated into the latter. Since the recess is situated on the upper side of the overlay, the positional relationship between primary coil and recess is predefined, so that on entering the recess the vehicle is also automatically positioned in relation to the primary coil.

A mobile inductive charging station for vehicles is proposed, in particular for motor vehicles such as electric vehicles, motor vehicles having a hybrid drive or also electrically assisted bicycles, wherein the inductive charging station comprises the flexible overlay. Commercial vehicles, in particular, such as articulated vehicles, buses, or special vehicles such as road sweepers may be used according to the invention. The inductive charging station further comprises a primary coil and a recess. The primary coil is connected to the overlay and in particular may be integrated onto the latter or fixed in or on the latter. At least the one recess is furthermore provided on the upper side of the overlay. A recess may be provided, say, for the left-hand or for the right-hand front wheel (or ear wheel or trailer wheel) of the motor vehicle, or two recesses may be provided, wherein one recess is provided for each of the two front wheels (or rear wheels or semi-trailer wheels) of the motor vehicle. In this case the recesses are spaced at a predetermined distance from one another, which in particular is equal to the track width of a vehicle that is to be charged by the inductive charging station.

As already mentioned, the recess is equipped with at least one inner side face, so that a wheel can be guided as it enters. Two opposing inner side faces or portions thereof are preferably provided on each recess, so that each wheel can be guided on both sides. The recess is adapted to receive at least one tire contact area of a vehicle tire. This defines the size of the receptacle, in particular its width, and furthermore defines how the flexible overlay beneath the recess is adapted to support the forces that can be generated by the wheels of a vehicle.

The overlay is, in particular, made from a flexible material, for example a mat. The flexible overlay may be composed of rubber or silicone, preferably of fiber-reinforced rubber or of silicone. Instead of rubber or silicone materials of comparable flexibility, in particular plastics may be used. The inner side faces of the recess are furthermore formed from a flexible material, in particular from the same material as the overlay itself. Moreover, the inner side faces and the recess may be integrally formed.

The flat underside, which is situated on the opposite side of the overlay to the receptacle, serves to rest on the floor. The adhesive power of the underside on the floor affords sufficient fixing, so that the inductive charging station does not slip when a vehicle runs over it. Furthermore, fastening elements may be provided, which connect the inductive charging station to the floor on which it is laid. For this purpose, the inductive charging station may have an eyelet (for a bolt or a screw to pass through) or some other fastener, which can be mechanically connected to the floor either directly or indirectly.

The recess itself, viewed in the width direction of the flexible overlay, is cylindrical with a convex shape, in particular an arched or special circular arc-shaped peripheral profile. The recess may therefore have a shape which is complementary to a lower portion of a (substantially circular-cylindrical) wheel. The recess may, in particular, have a larger radius of curvature or in general be less heavily curved than the portion of the wheel which the recess is designed to receive. It may be possible to vary the shape by means of an arresting device, wherein the arresting device in a first position has a first shape which allows a wheel to run into and out of the recess and in a second (deployed) position has a shape which prevents a wheel from running out. Such an arresting device is described herein as an embodiment in which the arresting device is retracted in the first position (vertical to the underside) and deployed in the second position relative to the underside.

The flexible overlay may furthermore comprise a guide channel which leads to the recess. The depth of the recess is greater than the depth of the guide channel. The guide channel may have a depth which increases as the distance from the recess diminishes. Furthermore, the channel may have a width which narrows towards the recess. The width of the guide channel may therefore taper towards the recess.

The recess may have a rigid, profiling support, which may be formed, for example, from plastics (possibly having a metal insert, in particular a steel insert), wherein this support is connected to the flexible overlay or in particular integrated into the latter.

Figure 3:
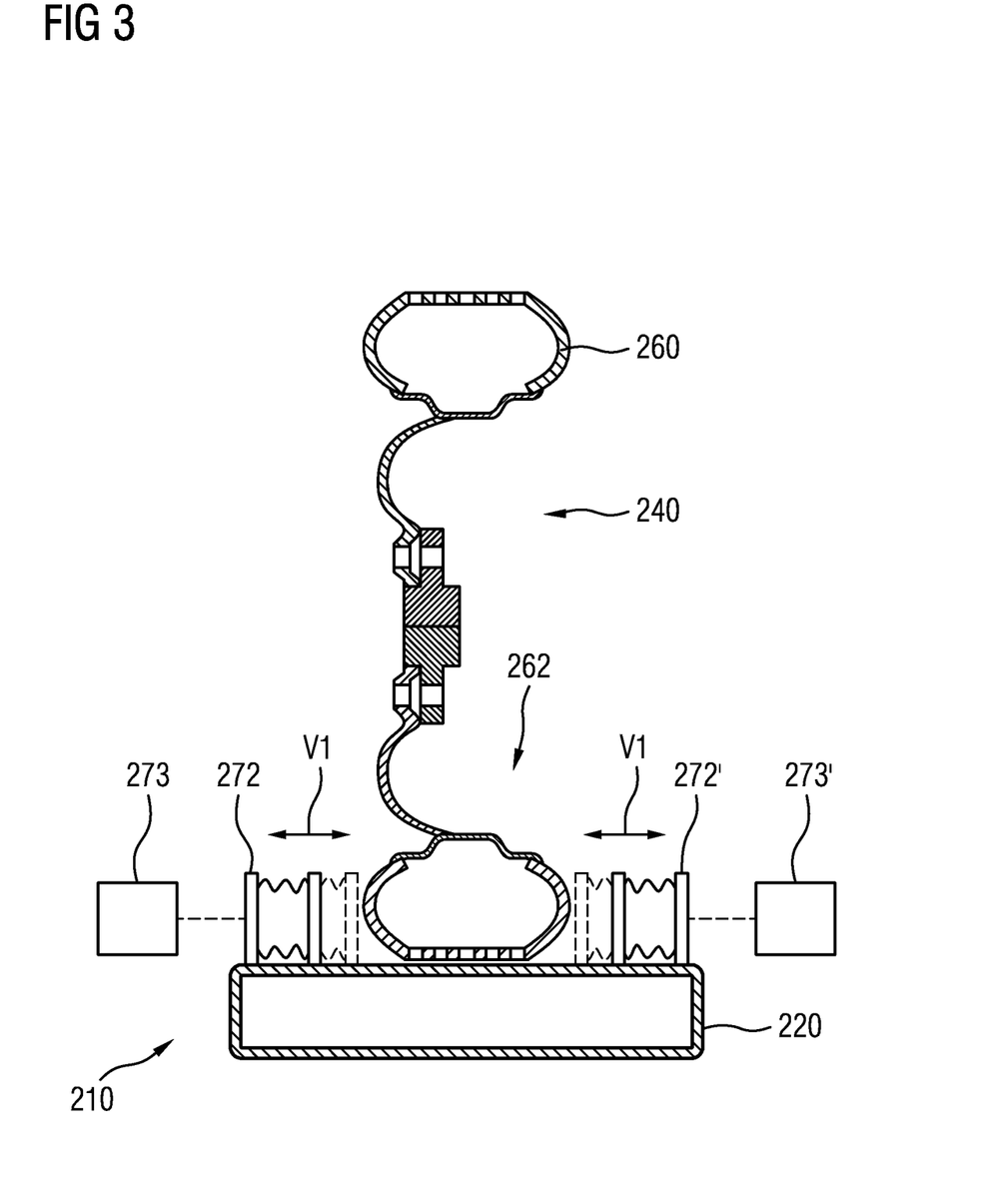
FIG. 3 shows a cross section through one embodiment of a mobile inductive charging station.

According to one aspect of the invention the mobile inductive charging device may comprise an arresting device, particularly in order to ensure a constantly precise positioning also during the charging operation. The arresting device has a locking face. This is movable. The locking face is adapted to come physically into contact with a wheel (or with its tire, in particular at least one side face of the tire) situated in the recess, so as to produce a static friction between the locking face and the wheel (in particular the side face of the tire of the wheel). Here the locking face may correspond to the inner side face or a portion thereof. This may be moved, in particular, by means of an actuator, which is mechanically connected to the inner side face or to the locking face in general. The actuator may be an electro-mechanical actuator, for example an electric motor, which may be connected to a transmission, for example to a geared spindle drive. The actuator may furthermore be pneumatic or hydraulic, particularly in the form of a bellows, which forms the inner side face or the locking face or which has a force-transmitting connection thereto, in order to move the inner side face into the recess according to the pressure inside the bellows. The actuator is therefore connected to the locking face. The actuator is moreover adapted to moving the locking face controllably towards and away from the middle of the recess. The locking face can be controllably moved in the direction of the middle of the recess, in order to arrest a wheel situated there and can be moved in the opposite direction in order to release a wheel situated there. A corresponding embodiment is represented in FIG. 3.

As a further embodiment the arresting device may comprise a locking member, which is arranged on the recess, but is not arranged inside the recess. The locking member can be brought into a position in which it prevents a wheel of the vehicle being able to move out of the recess. The arresting device may be equipped with a locking member and in particular comprises an actuator. The actuator has a force-transmitting connection to the locking member. The locking member can thereby be controllably moved in front of or behind the recess. The locking member may be provided at a transition between a drive channel and the recess or at one end of the drive channel which adjoins the recess. The actuator may give rise to a direction of movement of the locking member which is perpendicular to the longitudinal direction of the recess. The locking member is designed to be moved and supported in front of and/or behind the recess, in particular perpendicular to a recess entry direction. Here the stated directions "in front of" and "behind" relate to the longitudinal direction of the recess (corresponding to the recess entry direction).

Figure 4:
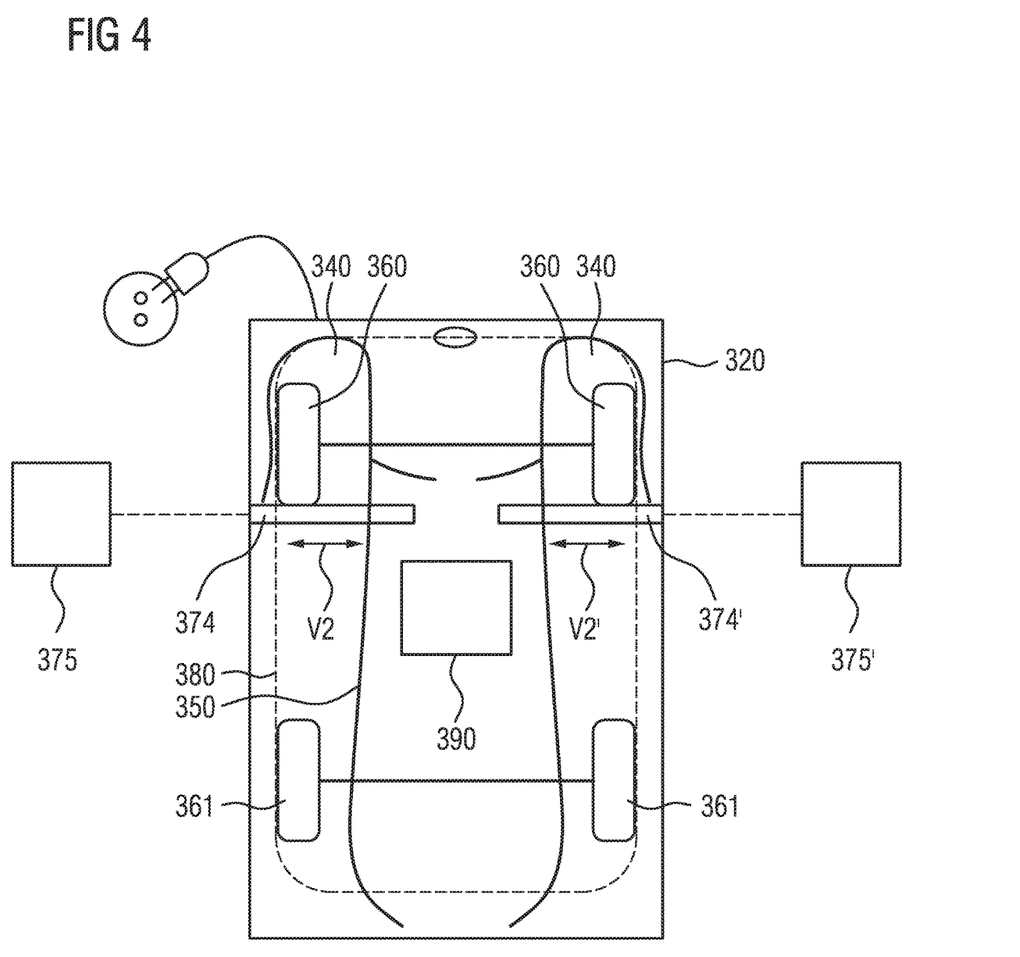
FIG. 4 shows a top view of one embodiment of a mobile inductive charging station.

In a first variant the locking member is to be supported in such a way that it has a direction of movement which is parallel to the upper side. Here the locking member may take the form of a rod, which is guided parallel to the upper side, wherein another bar may be used instead of a rod. Such an embodiment is represented in FIG. 4. According to the variant described above the locking member is situated on the upper side of the overlay and therefore outside the overlay itself.

According to a second variant the locking member is preferably provided inside the overlay. The connection to the actuator, in particular, means that the locking member may have a direction of movement which is perpendicular to the upper side and/or perpendicular to the underside. In other words, the actuator does not move the locking member along the upper side, as in the preceding variant, but away from and towards the latter. The precise angle between the direction of movement and the upper side is immaterial here, so that in the first variant the movement has a directional component which is parallel to the upper side, and in the second variant the movement has a directional component which is perpendicular to the upper side (in particular to the site of the locking member) or to the underside. In the first variant the direction of movement may also be parallel to the underside and in particular may have a component motion which runs parallel to the underside.

Figure 2:
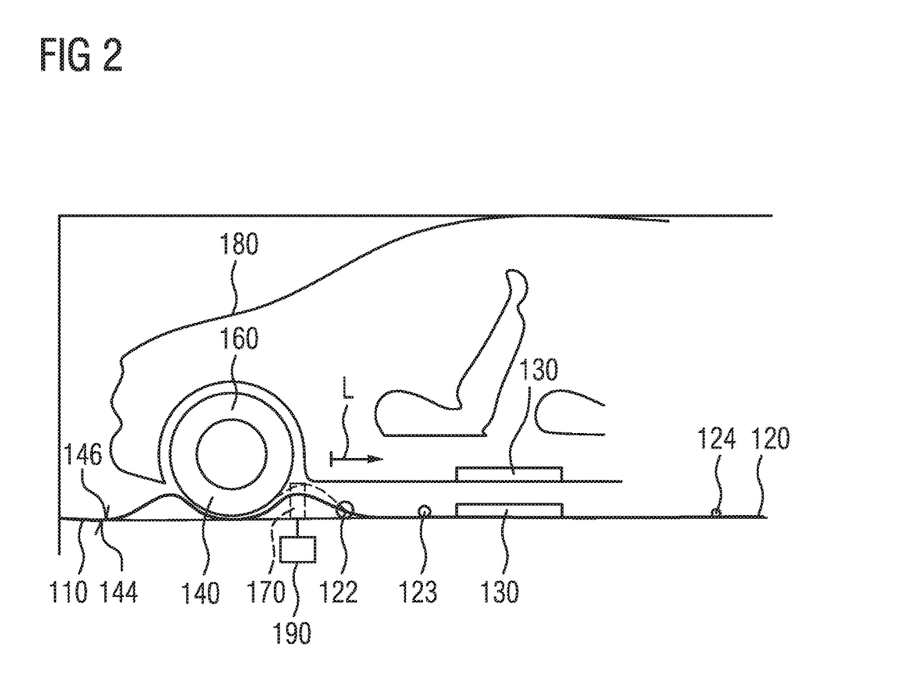
FIG. 2 shows a longitudinal section through one embodiment of a mobile inductive charging station.

Should the locking member move away from and towards the upper side or underside, the locking member is represented by a portion of the upper side of the inductive charging station which is referred to as the arresting portion. This arresting portion is flexible and movable in relation to the remainder of the upper side of the overlay. Here the arresting portion may be a part of a bellows, for instance, which forms a part of the upper side. The arresting portion can be moved by the actuator perpendicular to the upper side, in particular away from and towards the upper side. Alternatively, as already noted, the direction of movement may relate not to the upper side, but to the underside of the overlay. An embodiment of this second variant is represented in FIG. 2.

A further aspect is a foreign body removal device serving as part of the inductive charging station, which prevents foreign bodies from distorting the positioning of the vehicle. The foreign body removal device furthermore serves to remove objects which might interfere with the charging operation. The upper side may therefore comprise a portion which is situated above the primary coil and is therefore referred to as a coil portion. This coil portion is equipped with a foreign body removal device.

According to one embodiment of this aspect the foreign body removal device comprises a plurality of nozzles and a compressed air source connected thereto. Instead of the compressed air source a compressed air source connection may also be provided. The nozzles have apertures which are situated on the coil portion of the upper side. Objects which are situated on the coil portion of the surface, that is to say which are situated above the primary coil, can thereby be removed by a jet of compressed air generated by the nozzles.

According to a further embodiment the foreign body removal device comprises an actuator arrangement. This is connected to the (flexible) coil portion and is adapted in particular to moving the latter. The actuator arrangement is adapted to define a variable inclination of the coil portion. In other words, the actuator device is adapted to incline the coil portion to a variable degree. Here the actuator arrangement may comprise two individual actuators, which are activated at different times, thereby producing different inclinations over the course of time. Foreign bodies which are situated on the coil portion slide or roll off due to the (temporary) inclination of the coil portion and are thereby removed from the coil portion (in an edge area). The actuator arrangement may be an electro-mechanical arrangement, for example a shaft with a cam, which is led under the coil portion, but is preferably embodied by means of two individual actuators. The actuators (in this and other embodiments) are in particular pneumatic, hydraulic or preferably electro-mechanical actuators, particularly in the form of an electric motor combined with a geared spindle drive. The actuators of the actuator arrangement are provided at various sites on the coil portion, in particular at opposite ends of the coil portion. Two actuators are preferably used, although it is possible to use more than two actuators, which are sited at different points on the coil portion or and edge area of the latter. These actuators are preferably longitudinal actuators and have a direction of movement leading away from and towards the underside.

Figure 5A:
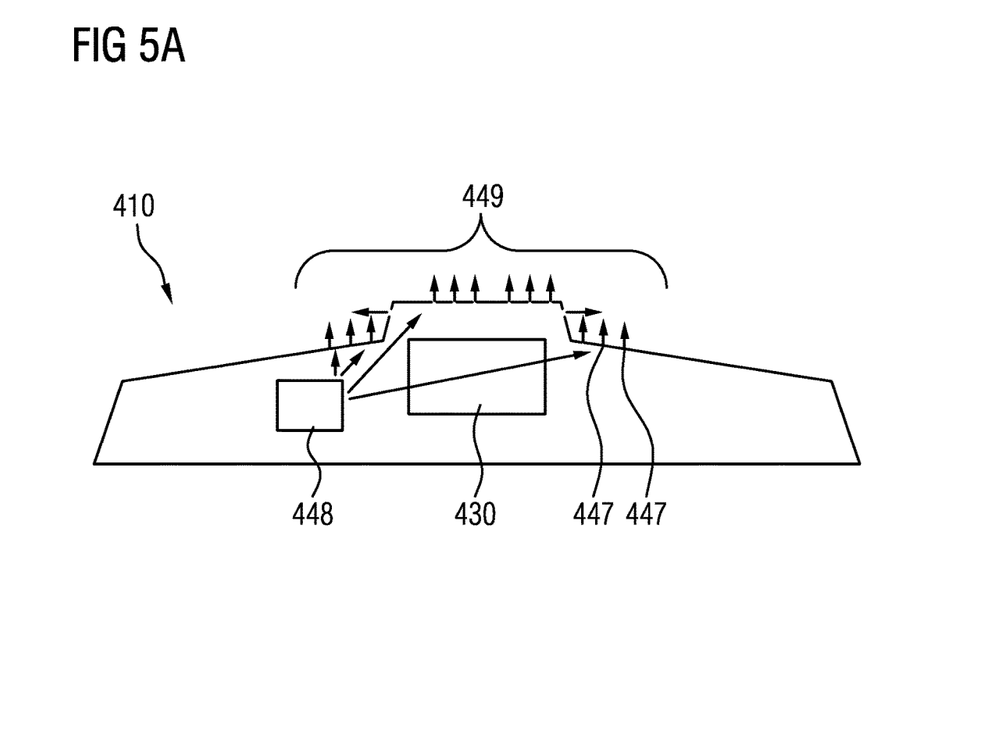
FIG. 5A-c show embodiments of a mobile inductive charging station in cross section, particularly in order to explain variants of the foreign body removal device.
Figure 5B:
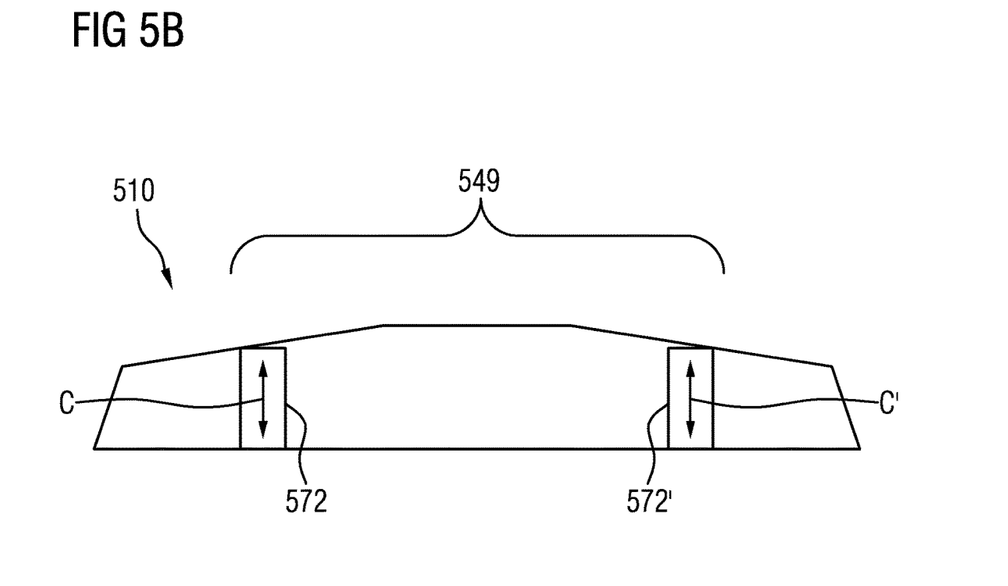

Whilst the nozzle-based foreign body removal device is represented in FIG. 5A, an embodiment of the inclination-based removal device is represented in FIG. 5B.

Figure 5C:
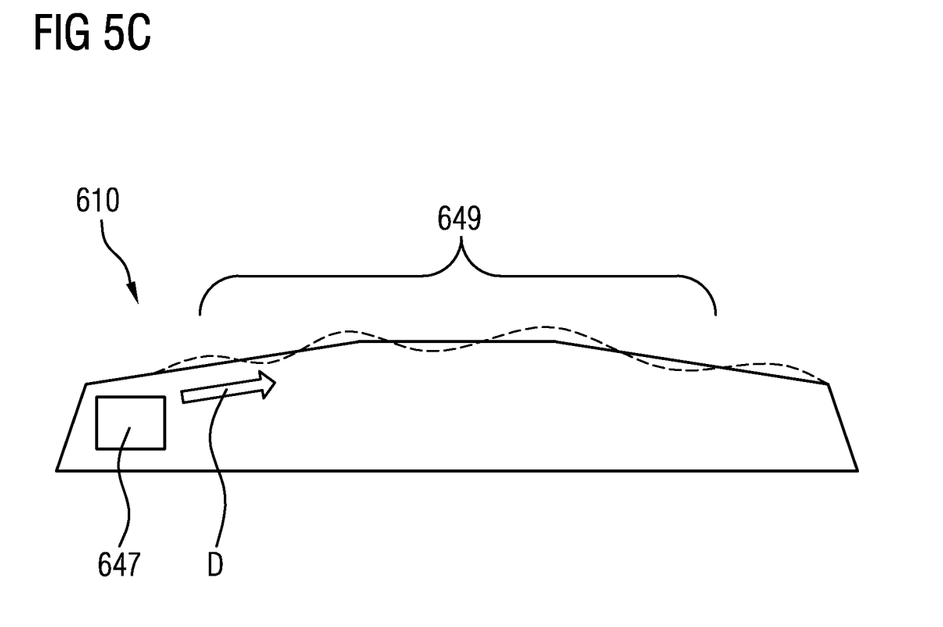

In a further embodiment of the foreign body removal device the coil portion is movable at at least one point (possibly in the form of a bellows having an open point). The foreign body removal device comprises a compressed air source or a connection for this, and at least one nozzle connected thereto. This nozzle has a main delivery direction, which leads along the coil portion (and in particular to the open point), so that the freedom of movement of the coil portion gives rise to a wobbling movement when compressed air flows through the nozzle. The open point is in particular freely movable in order to allow the coil portion of the surface to move up and down. The wobbling movement serves to remove foreign bodies from the coil portion. FIG. 5C shows a corresponding representation of this embodiment.

A drive channel may furthermore be let into the upper side of the overlay. This leads to the recess. As previously described, this drive channel is preferably endowed with a width which diminishes towards the recess. However, the drive channel may also have a constant width either in portions or over its entire length. Alternatively or in combination with this, the depth of the drive channel may increase towards the recess. This facilitates the entry and the guiding of the vehicle wheel towards the recess. However, the drive channel may also have a constant depth either in portions or over its entire length.

The mobile inductive charging station may furthermore comprise a head part. This is preferably fixed to the overlay by means of a (releasable) connection, in particular a plug-and-socket connection. The head part is situated outside the drive path towards the recess and preferably on the side of the recess which is opposed to the drive channel. The head part is, in particular, arranged next to the recess when the overlay is resting on the floor. In the longitudinal direction of the drive channel and the recess the head part aligns with the overlay or is provided behind the overlay in this direction (that is to say in the entry direction). A control device and/or a power output stage connected to the primary coil are provided in the head part. The power output stage controls the primary stage. The head part preferably has a rigid housing, made in particular of a plastic material. The housing may furthermore be reinforced by steel structures. The control device and/or the power output stage are accommodated in the housing. A drawer in which the control device and/or the power output stage can be accommodated, may be provided in the housing. The head part further comprises a power terminal for connection to a supply network. This embodiment is represented in more detail in FIGS. 6A and 6B.

Raised areas, which serve as markings, may be provided in the drive channel. For example, markings may be provided, the spacing between which diminishes towards the recess. The driver is thereby able to apprehend the distance from the recess without needing to see the latter himself. FIG. 2 shows examples of such raised areas.

Other features which are considered as characteristic for the invention are set forth in the appended claims.

Although the invention is illustrated and described herein as embodied in a mobile inductive charging station for vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE DRAWING

Figure 1:
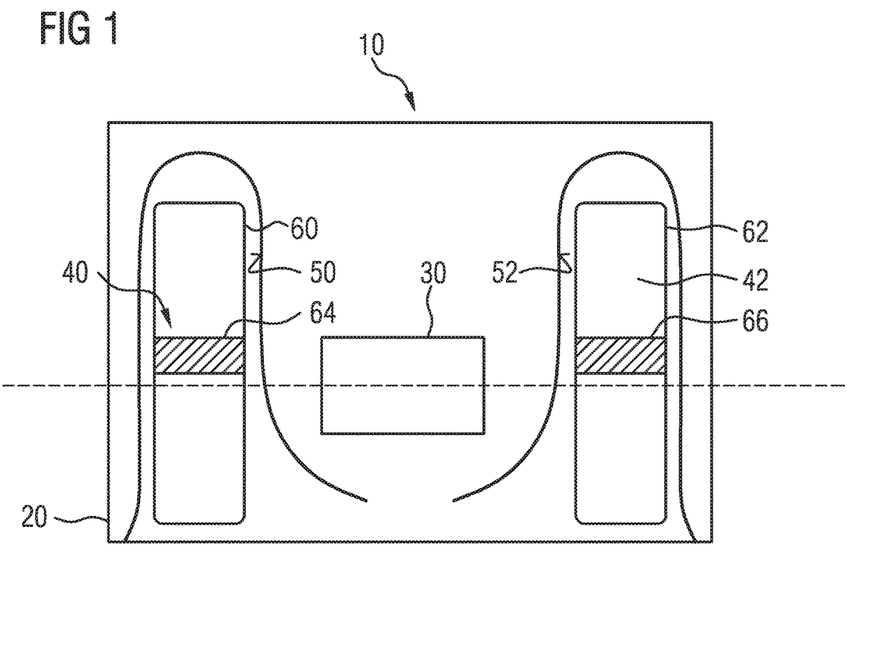
FIG. 1 shows a top view of one embodiment of a mobile inductive charging station.

Referring now to the figures of the drawing in detail and first, particularly, to FIG. 1 thereof, there is shown an embodiment of a mobile inductive charging station 10 for a vehicle with a flexible overlay 20 and a primary coil 30, which is provided between two recesses 40, 42. Generally the primary coil is preferably situated in an area between the recesses or between (imaginary) extensions of the recesses in their longitudinal directions. The recesses are defined by side faces 50, 52, wherein the recess 40 shown on the left has an inner side face 50. The side face 50 surrounds the full periphery of the recess 40 or encloses the latter over an angle of at least 180 or at least 270 degrees, and in particular encloses this, as shown, on three of four sides of a (virtual) rectangle. This also applies to the recess 42 and to the side face 52, which encloses the recess as shown.

A vehicle wheel 60, 62 is presented in each of the recesses 40, 42. FIG. 1 therefore represents the state in which a vehicle has driven into the mobile inductive charging station 10. A tire contact area 64 of the vehicle wheel 60 is situated in the recess 40 and a corresponding tire contact area 66 of the vehicle wheel 62 (or its tire) is situated in the recess 42. The inductive charging station represented in FIG. 1 is intended to receive the front wheels, a longer version of the inductive charging station also being feasible, however, in which the rear wheels of the vehicle are also presented above the inductive charging station when the vehicle is driven into the inductive charging station. FIG. 4 shows such a longer embodiment.

FIG. 2 shows a vehicle 180, which has been driven into a mobile inductive charging station 110. FIG. 2 is a sectional side view, in which the inductive charging station 110 has an underside 144 and an upper side 146. A recess 140 is provided in the upper side 146. A vehicle tire 160 of a vehicle wheel of the vehicle 180 is situated in this recess. The recess forms a trough. The shape of the recess is matched to a peripheral portion of a tire 160. The recess therefore encloses a part of the tire 160, so that a (partial) positive interlock results between the receptacle 140 and the tire 160.

In the state represented in FIG. 2, in which the vehicle 180 has been driven into the inductive charging station 110, the primary coil 130 is situated below the secondary coil 190 of the vehicle 180. Raised areas 122, 123, 124 are furthermore situated on the upper side 146 of the overlay 120 of the inductive charging station 110, preferably inside a drive channel, which leads to the recess 140.

FIG. 2 further shows an embodiment of an arresting device in the form of the lifting cylinder 170, which is powered by a controllable compressed air source 190. Instead of a lifting cylinder 170, a geared spindle drive may also be provided, which is driven by an electric motor. The locking member is furnished by the element (that is to say the lifting cylinder 170), which is powered by the drive embodied as a compressed air source 190, although the element may be provided by a reciprocating piston 170 or by a geared spindle drive or by other devices, which are designed to vary in length. As shown, the locking member may also be formed by the portion of the surface situated above the arresting device together with the element. In the deployed state the locking member pushes a part of the upper side 146 of the overlay 120 upwards, so that the vehicle is prevented from driving out, since in the deployed state the reciprocating piston 170 or the locking member in general together with the portion of the upper side encloses the wheel 140 in such a way that the vehicle 180 cannot drive out, at least not in the exit direction L.

FIG. 3 shows a vehicle wheel 240 with associated vehicle tire 260 in longitudinal section. The tire is situated in an embodiment of the inductive charging station 210 described here, which is represented in cross section. The tire rests on an overlay 220. An arresting device is provided to the side (of the tire). This device comprises locking members 272, 272'. The locking members 272, 272' form a locking face, that is to say a face which is turned towards the tire 260 and which can be moved in a direction pointing into the recess, in order to arrest the tire by means of static friction. The direction of movement of the locking face is identified by the letter V1. In FIG. 3 the arresting device is represented as a bellows, but it may also be provided in the form of a pneumatic or hydraulic piston or also as a mechanical interface of an electro-magnetic linear drive (possibly an electric motor with geared spindle drive). Actuators 273, 273' are provided, which are mechanically connected to the locking face 272, 272'. In the embodiment as a bellows controllable compressed air sources are provided, which are connected to the bellows, which forms the locking face or at least moves the latter.

In FIG. 3 the overlay 220 is equipped with a floor portion, situated on top of which is a side portion, which forms the inner side faces 272, 272'. The floor portion and the side portion may be formed in two parts. The recess and possibly the drive channel are formed by the side portion. The recess 262 is produced by connecting the side portion to the floor portion. The side portion and the floor portion of the overlay may be manufactured from different materials and may, in particular, be of different stiffness, the side portion in particular being less rigid than the floor portion.

FIG. 4 shows a mobile inductive charging station having a longer overlay 320 on which not only the front wheels 360 but also the rear wheel 361 of a vehicle 380 can be received. FIG. 4 further serves to represent locking members 374, 374', each with associated actuators 375, 375'. The locking member 374, 374' is in each case moved in a direction of movement V2, V2'. The movements V2 and V2' are opposed to one another and may push the respective locking members 374, 374' behind the front wheel 360 or take it out of the direction of travel of the wheels 360. For the locking member in FIG. 4, a direction of movement V2 (or V2') therefore results which is perpendicular to the direction of travel of the vehicle, that is to say perpendicular to the rolling direction of the tire 360, and which is furthermore parallel to the upper side of the overlay and the inductive charging station. In FIG. 4 the locking members 374, 374' are shown as bars or rods. In an embodiment not shown one of the locking members represented is sufficient to prevent the vehicle driving out.

FIG. 4 further shows a side face 350, which not only forms the inner side face of the recess, in which a front wheel is arranged, but which also extends still further along the rear wheels and beyond these. Also represented is a secondary coil 390, which is situated above a primary coil (hidden by the secondary coil). In this state the wheels 360 are optimally positioned in the recesses 340, so that the primary coil and the secondary coil are spatially arranged in relation to one another for the maximum transfer of power.

FIGS. 5A, 5b and 5C show different possible ways of equipping the inductive charging station with a foreign body removal device. The foreign body removal device may be embodied by a plurality of nozzles, an actuator arrangement for variable inclination of the coil portion or an individual nozzle, which is directed along the coil portions.

FIG. 5A represents a cross section through a mobile inductive charging station 410, in which a portion in the upper side of the inductive charging station, which is referred to as the coil portion 449, is provided above the primary coil 430. This coil portion 449 comprises, in particular, a portion aligning with the outside dimensions of the coil, but may also additionally comprise edge areas, which extend the area lying directly above the primary coil 430 outwards. FIG. 5A shows an inductive charging station 410, in which the coil portion 449 extends beyond the portion that aligns precisely with the primary coil 430, so as to be able also to protect edge areas from foreign bodies. A plurality of nozzles, which are represented as interruptions in external contour lines represented in FIG. 5A, are represented in the coil portion. For greater clarity, only some of these nozzles are provided with the reference numeral 447. The arrows represented by dotted lines indicate the direction of flow, which proceeds from a compressed air source 448, wherein to a compressed air source 448 the inductive charging station 410 may also comprise a connection for an external compressed air source. FIG. 5A shows that the air first flows from the compressed air source 448 (or a corresponding connection) through the interior of the inductive charging station (in particular the flexible overlay), leaves the interior of the inductive charging station through the plurality of nozzles 447, and then emerges from the surface of the overlay or the inductive charging station 410. The flow represented by the arrows is preferably generated only for a specific period of time, in particular before commencement of the charging operation or at regular intervals during the charging operation, in order to remove objects situated above the primary coil 430 from the coil portion.

The reference numeral 449 covers not only the precise portion 430 but also an adjoining edge portion. As shown in FIG. 5A, the coil portion 449 comprises (regularly spaced) nozzles. It can furthermore be seen from FIG. 5A that above the coil there may be a middle component portion substantially parallel to the underside of the inductive charging station 410, which portion falls away sharply towards the edge of the inductive charging station in a flank portion, before then merging into an inclined component portion. The component portion and also the sides of the sharp transition (that is to say the flank portion) comprise nozzles, automatically resulting in different directions of flow automatically on the different component portions.

FIG. 5B shows a charging station 510 having an actuator arrangement, which is connected to the one coil portion 549 of the upper side of the inductive charging station 510. The actuator arrangement comprises two individual actuators 572 and 572', which have the direction of movement C and C' respectively. The direction of movement is substantially perpendicular to the underside and also substantially perpendicular to the upper side of the overlay. A control (not shown) is provided, which staggers the activation of the individual actuators 572 and 572', automatically resulting in an inclination of the coil portion 549 that varies over the course of time. If the actuator 572 is first deployed, say, this results in an inclination sloping towards the right, this again being reduced, if the actuator 572' is then deployed. Similarly, an inclination results if the actuator 572' at first remains deployed, whilst the actuator 572 retracts.

The actuators 572 are, in particular, longitudinal actuators. General longitudinal actuators are shown, which may be of electro-mechanical, pneumatic or hydraulic design. As an alternative to two individual actuators 572 and 572', an actuator device can be provided which is fixed to the coil portion at multiple points, in order to perform a rotational movement. Such a rotational movement has an axis of rotation which runs parallel to the upper side or to the underside of the inductive charging station. With such an actuator arrangement various inclinations can be set through different rotational movements. Such an actuator arrangement may have a drive, such as an electrical, pneumatic or hydraulic rotational drive which generates the rotational movement. Furthermore, actuators may be provided with camshafts, the cams being provided at different sites on the coil portion and being angularly offset in relation to one another. Driving these camshafts automatically produces a varying inclination of the coil portion 549.

FIG. 5C shows a further possible embodiment of the foreign body removal device, in which a nozzle 647 (represented diagrammatically by a rectangle) generates a compressed air flow D along the coil portion 649. The upper side of the inductive charging station is movable at at least one point, in particular at a point opposite the nozzle 647. This gives rise to a wobbling movement of the upper side, in particular of the coil portion 649, so that foreign bodies can be removed. Instead of a separate compressed air source, the inductive charging station 610 may have a connection for this purpose. This connection or this source is connected to the nozzle 647, which is provided inside the inductive charging station or at least inside the flexible overlay. Here the coil portion 649 provided may be more flexible than the rest of the inductive charging station, in order to allow the wobbling movement. As in FIG. 5A, the foreign body removal devices in FIGS. 5B and 5C may be activated only at specific times, for a specific period of time before the vehicle is driven into the inductive charging station, before commencement of the charging operation or also (regularly) during the charging operation.

Figure 6A:
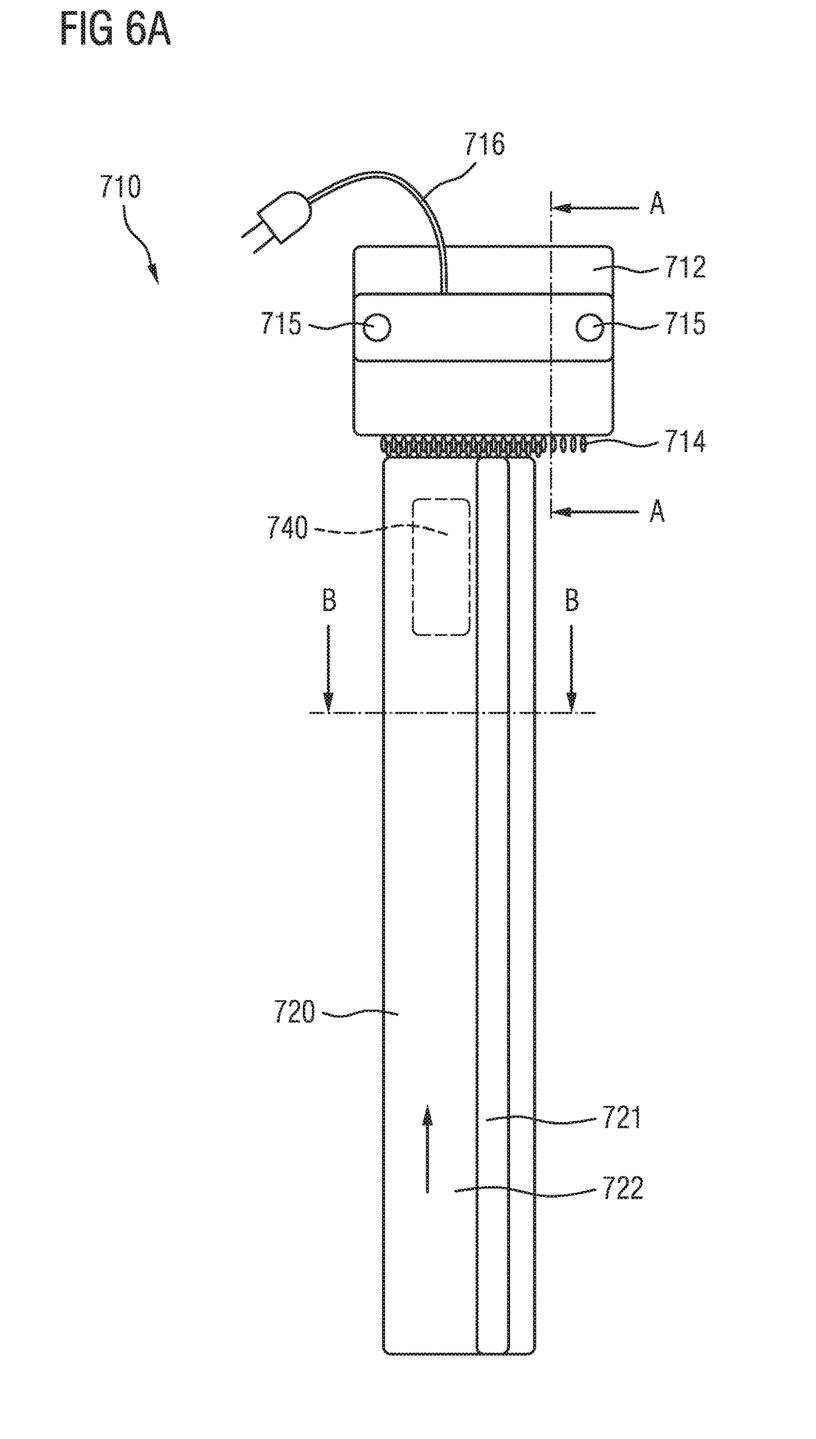
FIG. 6A-c show top views of one embodiment of a mobile inductive charging station and on the basis of various sectional views.

FIG. 6A serves to represent an inductive charging station 710 having a head part 712, which is fixed to the flexible overlay 720. It can be seen that a plug-and-socket connection 714 serves for connection between the head part and the overlay, wherein the overlay comprises a drive channel 722. The recess into which a vehicle wheel can be introduced is provided in the area 740. The plug-and-socket connection system 714 comprises a plurality of individual, plug-and-socket connection elements arranged in sequence, wherein the head part and the flexible overlay can be connected together via various sub-assemblies of the plug-and-socket connection elements. A lateral offset can thereby be produced between the head part 712 and the overlay 720, in order to take account of different track widths, for instance.

FIG. 6A further shows fasteners 715 in the form of bolts, which are inserted through an opening in the head part 712 (perpendicular to the upper side of the inductive charging station). The bolts 715 can be used to anchor the inductive charging station or at least the head part in the floor, on which the inductive charging station is laid. This results in a releasable, secure connection designed to prevent the inductive charging station being removed without authorization, for instance. Furthermore, the head part 712 may comprise an electrical connection 716, by means of which the electronics and in particular the power output stage of the head part can be connected to an electrical supply network.

Figure 6B:
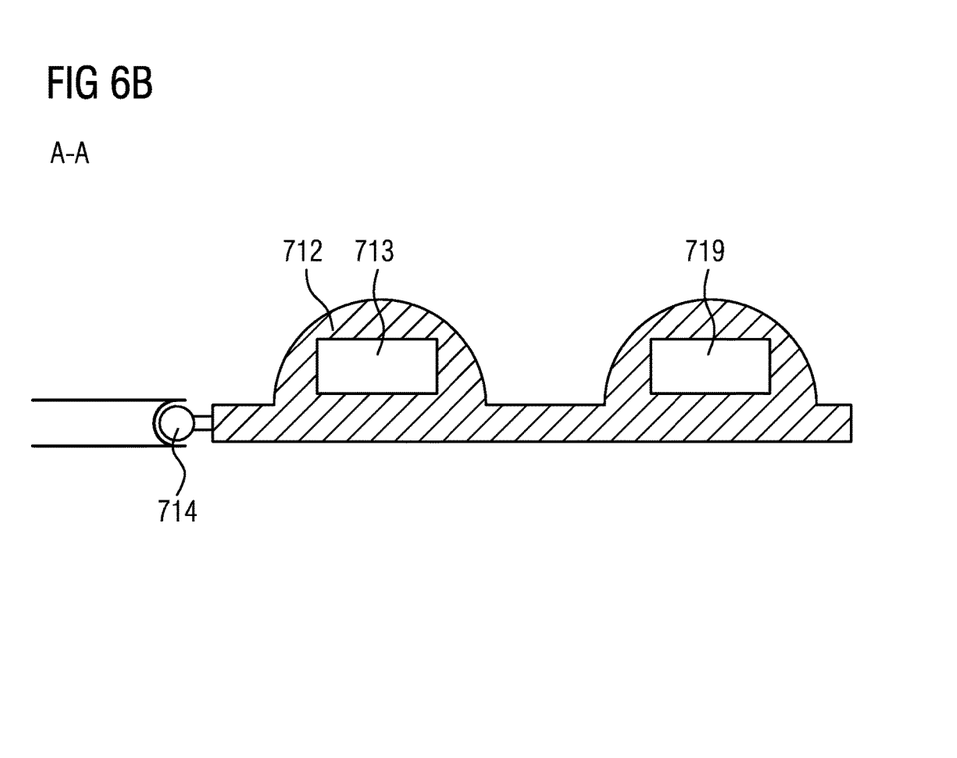

FIG. 6B shows a longitudinal section through the head part 712 according to the plane of section A-A, which is represented in FIG. 6A. Electronics, such as a power output stage, a control device, or both of these, are situated in a first cavity 713 of the head part 712. A further cavity 714 is likewise situated in the head part, preferably in a different raised area from the cavity 713, water being provided in the cavity 714.

Figure 6C:
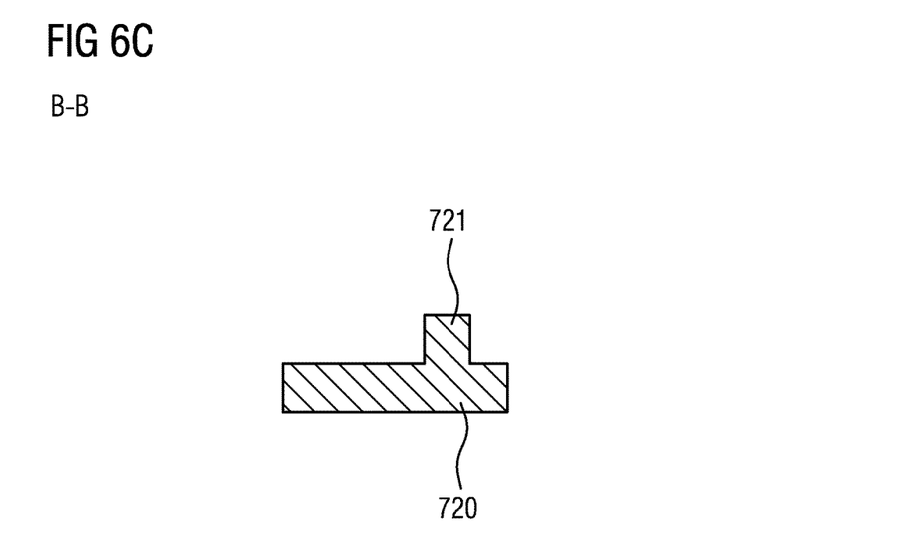

FIG. 6C shows a cross section through the overlay 720 according to the section B'B, as is represented in FIG. 6I. Here the drive channel is formed on one side by a raised area 721, which runs in the longitudinal direction of the overlay 720 and which extends along the overlay 720 in order to serve as a guide in this direction. The raised area forms a side wall or a side face to the track guide.

The cavities 713 and/or 714 may comprise a drawer (or multiple drawers), in which the electronics might be situated. FIGS. 6B and 6A furthermore show that the head part 712 and the overlay 720 are aligned side-by-side in the longitudinal direction of the overlay (that is to say viewed in the entry direction of the vehicle) and are connected together by the connection 714.

The invention claimed is:
1. A mobile inductive charging station for a vehicle, the inductive charging station comprising:
an overlay having an upper side and a flat underside opposite said upper side;
a primary coil connected to said overlay;

said overlay having at least one recess formed on said upper side of said overlay, said at least one recess having an inner side face and being configured to receive at least one tire contact area of a vehicle tire; and an arresting device configured to move a portion of said overlay within said at least one recess in order to arrest the vehicle tire in the recess and to prevent the vehicle from driving out of the recess.

2. The mobile inductive charging station according to claim 1, wherein said at least one recess is one of two recesses each having a respective said inner side face.

3. The mobile inductive charging station according to claim 1, said arresting device comprising a locking face that corresponds to said at least one inner side face, and an actuator, which is connected to said locking face and is configured to move said locking face controllably towards and away from a center of said at least one recess and to selectively change a width of said recess.

4. The mobile inductive charging station according to claim 1, wherein said recess is delimited in a forward direction by a stop for the vehicle tire, and the arresting device is equipped with a locking member and an actuator, wherein said actuator is connected to said locking member and is configured to move said locking member controllably behind the recess in order to arrest the vehicle tire between said locking member and said stop.

5. The mobile inductive charging station according to claim 4, wherein:
said locking member, by virtue of the connection to the actuator, has a direction of movement which is parallel to said upper side; or
said locking member, by virtue of the connection to the actuator, has a direction of movement which is perpendicular to the upper side.

6. The mobile inductive charging station according to claim 5, wherein the direction of movement of said locking member is defined by a rod which is guided parallel to said upper side.

7. The mobile inductive charging station according to claim 5, wherein the direction of movement of said locking member is defined by a flexible arresting portion of said upper side of the inductive charging station, which can be moved by said actuator perpendicular to said upper side.

8. The mobile inductive charging station according to claim 1, which comprises a foreign body removal device disposed at at least one coil portion of the upper side of the inductive charging station, which is situated above said primary coil.

9. The mobile inductive charging station according to claim 8, wherein said foreign body removal device comprises a plurality of nozzles and a compressed air source connected to said nozzles, wherein said nozzles include apertures on the coil portion of the upper side.

10. The mobile inductive charging station according to claim 8, wherein said foreign body removal device comprises an actuator arrangement, connected to the coil portion, said actuator arrangement defining a variable inclination of the coil portion.

11. The mobile inductive charging station according to claim 8, wherein the coil portion is movable at at least one point and said foreign body removal device comprises a compressed air source and at least one nozzle, which is connected thereto and which is directed in a direction along the coil portion.

12. The mobile inductive charging station according to claim 1, which further comprises at least one drive channel let into said upper side and leading to said recess.

13. The mobile inductive charging station according to claim 1, which further comprises a head part and a plug-and-socket connection affixing said head part to said overlay, and wherein a control device and/or a power output stage connected to said primary coil are provided in said head part, said head part having a rigid housing in which at least one or both of said control device or said power output stage are accommodated.

14. A mobile inductive charging station for a vehicle, the inductive charging station comprising:
an overlay having an upper side and a flat underside opposite said upper side;
a primary coil connected to said overlay; and
said overlay having at least one recess formed on said upper side of said overlay, said at least one recess having an inner side face and being configured to receive at least one tire contact area of a vehicle tire;
an arresting device equipped with a locking member and an actuator, wherein said actuator is connected to said locking member and is configured to move said locking member controllably in front of and/or behind the recess;
said locking member, by virtue of the connection to said actuator, having a direction of movement that is parallel to the upper side; or
said locking member, by virtue of the connection to said actuator, having a direction of movement that is perpendicular to the upper side; and
wherein the direction of movement of said locking member is defined by a flexible arresting portion of said upper side of the inductive charging station, which can be moved by said actuator perpendicular to said upper side.

15. The mobile inductive charging station according to claim 1, wherein said arresting device is configured to lift a portion of said overlay within said recess behind the wheel in order to form a trough having a shape matched to a peripheral portion of the wheel and arresting the vehicle in position during a charging operation and preventing the vehicle from driving out of the recess.

16. The mobile inductive charging station according to claim 1, wherein said arresting device comprises at least one locking member with a locking face disposed on a side of the vehicle tire and configured to move said inner side face of said overlay towards the vehicle tire and to arrest the vehicle tire by static friction between said inner side face and the vehicle tire.

* * * * *